US005389172A

United States Patent [19]

Kobayashi et al.

[11] Patent Number: 5,389,172

[45] Date of Patent: Feb. 14, 1995

[54] METHOD OF CARRYING OUT EXPOSED AGGREGATE TEXTURED CONCRETE FINISHES

[75] Inventors: Teruaki Kobayashi; Masahito Oyama; Hiroyuki Enomoto, all of Kawasaki; Hiroyuki Ogawa, Fuchu; Yutaka Tamura, Fuchi, all of Japan

[73] Assignees: Sliontec Corporation, Kanagawa; Seltec Corporation, Tokyo, both of Japan

[21] Appl. No.: 126,715

[22] Filed: Sep. 27, 1993

[30] Foreign Application Priority Data

Oct. 22, 1992 [JP] Japan .................................. 4-284234

[51] Int. Cl.[6] .......................... B28B 1/16; B28B 3/00; B32B 31/00

[52] U.S. Cl. .................................... 156/155; 156/230; 156/245; 156/247; 156/344; 264/256; 264/316; 264/333

[58] Field of Search ............... 156/245, 247, 344, 155, 156/232, 236, 230, 231, 238; 264/333, 256, 316, 317, 337

[56] References Cited

U.S. PATENT DOCUMENTS

| | | | |
|---|---|---|---|
| 985,353 | 2/1911 | Landis . | |
| 1,169,985 | 2/1916 | Mickelson | 156/155 X |
| 3,279,968 | 10/1966 | Wisotzky | 156/232 X |
| 3,331,729 | 7/1967 | Danielson et al. | 156/71 X |
| 3,378,617 | 4/1968 | Elmendorf . | |
| 3,496,264 | 2/1970 | Grant | 264/333 X |
| 3,737,511 | 6/1973 | Dillon . | |
| 3,754,065 | 8/1973 | Hofmann et al. | 156/71 X |
| 4,146,599 | 3/1979 | Lanzetta | 264/35 |
| 4,213,926 | 7/1980 | Toyoda et al. | 156/232 X |
| 4,915,888 | 9/1990 | Sato . | |
| 5,271,781 | 12/1993 | Anno et al. | 156/71 |

FOREIGN PATENT DOCUMENTS

| | | | |
|---|---|---|---|
| 2135642 | 1/1973 | Germany | 156/245 |
| 0036173 | 3/1977 | Japan | 156/247 |
| 56-169189 | 12/1981 | Japan . | |
| 1120399 | 5/1989 | Japan | 156/230 |
| 0187252 | 7/1989 | Japan | 156/230 |
| 0010806 | 1/1991 | Japan | 264/333 |
| 4176958 | 6/1992 | Japan . | |
| 2211181 | 6/1989 | United Kingdom | 261/333 |

*Primary Examiner*—Karen Aftergut

*Attorney, Agent, or Firm*—Birch, Stewart, Kolasch & Birch

[57] ABSTRACT

A method of carrying out aggregate exposed finish for concrete capable of extremely reducing the usage amount of decorative aggregates, and of facilitating the work without requiring the long working time and the technique of a high level is as follows. The method includes the steps of: loading aggregates on an adhesive sheet; burying part of the aggregates in an adhesive layer of the adhesive sheet; casting mortar or concrete onto an aggregate loading surface of the aggregate loading adhesive sheet; hardening the mortar or concrete; and removing the adhesive sheet.

4 Claims, 1 Drawing Sheet

METHOD OF CARRYING OUT EXPOSED AGGREGATE TEXTURED CONCRETE FINISHES

BACKGROUND OF THE INVENTION

1. Technical Field of the Invention

The present invention relates to a method of carrying out aggregate exposed finish for architectural decorative concrete, and particularly to a method of carrying out aggregate exposed finish for concrete capable of extremely reducing the usage amount of expensive decorative aggregates, and of facilitating the work without requiring the long working time and the technique of a high skill level.

2. Description of the Prior Art

For carrying out aggregate exposed finish for decorative concrete, there has been mainly used a technique called a washing method until now. As for this washing method, there has been adopted such a method that mortar mixed with aggregates is placed on the substrate of concrete; and the mortar on the surface is washed away in the state that the mortar is still plastic to expose part of the aggregates. In recent years, there is a tendency of using such a technique that mortar mixed with aggregates is placed on the substrate of concrete; and then a surface retarder is sprinkled on the surface of the mortar. Further, the special sheet called a retarder paper tends to be used. In these methods, the hardening of the mortar on the surface is retarded, and when only the interior of the mortar is hardened, the unhardened surface layer is washed away, to expose part of the aggregates.

However, the prior art washing method described above has the following disadvantages: namely, a large amount of inorganics containing heavy metal and the like must be treated because mortar is washed away with a large amount of water; expensive decorative aggregates in an amount more than necessary must be used; and a long working time and the technique of a high skill level must be required for carrying out the decorative finish with a complicated pattern. Thus, there has been strong demands to solve the above disadvantages.

SUMMARY OF THE INVENTION

To solve the above problems of the prior art, the present invention has been made, and an object of the present invention is to provide a method of carrying out aggregate exposed finish for concrete capable of extremely reducing the usage amount of aggregates, and of facilitating the work without requiring the long working time and the technique of a high skill level.

To achieve the above object, in a first aspect of the present invention, there is provided a method of carrying out aggregate exposed finish for concrete comprising the steps of: loading aggregates on an adhesive sheet; burying part of the aggregates in an adhesive layer of the adhesive sheet; casting mortar or concrete onto an aggregate loading surface of the aggregate loading adhesive sheet; hardening the mortar or concrete; and removing the adhesive sheet.

In a second aspect of the present invention, there is provided a method of carrying out aggregate exposed finish for concrete comprising the steps of: loading aggregates on an adhesive sheet; burying part of the aggregates in an adhesive layer of the adhesive sheet; press-contacting an aggregate loading surface of the aggregate loading adhesive sheet with unhardened mortar or concrete; hardening the mortar or concrete; and removing the adhesive sheet.

In a third aspect of the present invention, there is provided a method of carrying out aggregate exposed finish for concrete comprising the steps of: loading aggregates on an adhesive sheet; burying part of the aggregates in an adhesive layer of the adhesive sheet; fixing the substrate of the aggregate loading adhesive sheet on a form; casting mortar or concrete so as to be contacted with an aggregate loading surface of the aggregate loading adhesive sheet; hardening the mortar or concrete; and removing the adhesive sheet and the form.

In a fourth aspect of the present invention, there is provided a method of carrying out aggregate exposed finish for concrete comprising the steps of: loading aggregates on an adhesive sheet; burying part of the aggregates in an adhesive layer of the adhesive sheet; fixing substrate surface of the aggregate loading adhesive sheet on a form; press-contacting an aggregate loading surface of the aggregate loading adhesive sheet with unhardened mortar or concrete; hardening the mortar or concrete; and removing the adhesive sheet and the form.

In carrying out a decorative finish with a multi-color pattern using various decorative aggregates having different shapes and colors, first, an adhesive sheet is covered with a release paper in which only the first aggregate loading portions are cut out, and the first aggregates are scattered on only the cut-out portions. Thus, by sequentially repeating this operation by the required number of times, it is possible to obtain the aggregate sheet with the desired pattern. By use of such an aggregate loading sheet with a multi-color pattern, it is possible to carry out the concrete finish with the aggregates being exposed in the multi-color pattern.

By scattering aggregates, for example, decorative aggregates of about 10 mm in size on an adhesive sheet, the aggregates are easily fixed to the adhesive sheet to the extent that the adhesive sheet can be carried. Further, by suitably selecting the kind of an adhesive of an adhesive sheet and the thickness of an adhesive layer, it is possible to suitably bury aggregates in the adhesive layer by their dead weights through wholly heating the adhesive sheet and the aggregates loaded thereon. The degree of burying can be adjusted by selection of, the kind of adhesive, heating temperature, heating time and the like. In addition, after loading aggregates on an adhesive sheet, the aggregates can be buried in the adhesive layer by pressing the aggregates while suitably heating it as needed. When mortar or concrete is placed on the adhesive sheet in which the aggregates are suitably buried, the mortar or concrete is made to flow over the surface of the aggregates and the adhesive layer, and it can perfectly cover the surfaces of the aggregates exposed from the adhesive layer. The aggregates are strongly bonded along with the hardening of the mortar or concrete.

The adhesive strength of the adhesive used is, of course, required to be in a range for preventing the fallout of the aggregates loaded or the adhesive strip during the work; and further, it must be in a range for easily separating the adhesive sheet from surfaces of the aggregates and mortar in removal of the adhesive sheet after hardening of the mortar or concrete. When the adhesive strength is less than about 2N/cm, the adhesive sheet can be easily removed; however, the aggregates are at risk of becoming detached during the work. For holding the aggregates during the work, the adhesive strength is required to be more than 3N/cm. Even when the adhesive strength is in the degree of 3N/cm or more in the dry state, since the mortar is placed together with a large amount of water and further a water content tends to be present slightly at the interface between the adhesive and the mortar even in separation of the sheet, the adhesive sheet of such a type as being weak against water is extremely reduced in its adhesive strength. Further, since water gradually permeates at the interface between the aggregates and the adhesive, the adhesive strength at this portion is significantly reduced. Thus, even in use of the adhesive sheet having an adhesive strength enough to endure the work since the adhesive strength is reduced due to the action of water after the mortar or concrete is placed, it is possible to separate the sheet while leaving the aggregates in the mortar or concrete layer. This is one of the advantages in a construction method using the adhesive sheet.

The method of carrying out aggregate exposed finish for concrete using the adhesive sheet further has the following advantage: Namely, in the prior art construction method, concrete as a substrate is first prepared, mortar mixed with decorative aggregates being placed on the concrete in a suitable amount, and the surface of the mortar is washed away with water. On the contrary, in the method using the adhesive sheet, the mortar layer is not necessarily formed on concrete, that is, it is possible to prepare the aggregate exposed concrete by directly placing concrete so as to be contacted with the adhesive sheet surface in which the aggregates are buried. The construction method of this type is advantageous, particularly, in directly forming exposed aggregates on the vertical surface. Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

PREFERRED EMBODIMENT OF THE INVENTION

Figure 1:
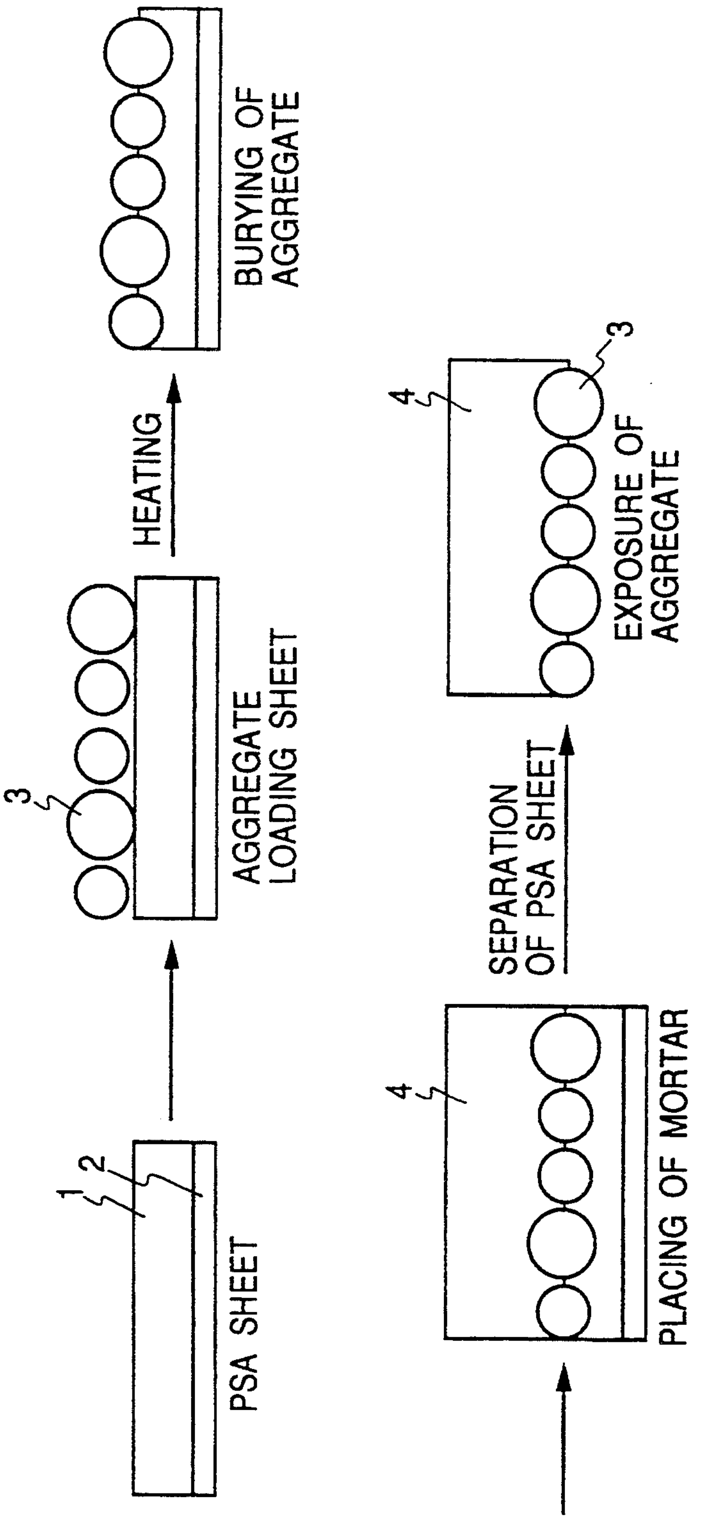
FIG. 1 is a sectional view showing the flow chart of one embodiment of a method of carrying out aggregate exposed finish for concrete according to the present invention.

Hereinafter, a method of carrying out aggregate exposed finish for concrete according to the present invention will be described in detail by way of embodiments. In addition, the embodiments represent the preferred forms of the present invention, and therefore, the present invention is not limited thereto.

EXAMPLE 1

FIG. 1 is a sectional view showing a flow chart of one embodiment of a method of carrying out aggregate exposed finish for concrete according to the present invention.

First, aggregates 3 were scattered on an adhesive layer 1 of an adhesive sheet with dimensions of (30cm×30 cm), being composed of the rubber based adhesive layer 1 and a plastic made substrate 2. Thus, the aggregates 3 were stuck and loaded on the adhesive layer 1. Subsequently, the aggregate loading adhesive sheet was inserted in an electric furnace, and heated at 150° C. for 15 min, so that part of the aggregates 3 was buried in the adhesive layer 1. The sheet was then removed from the electric furnace and cooled to room temperature, after which a mortar 4 of cement: sand in a 1:3 ratio was placed on the aggregates 3. This was left at room temperature for two days after the placing of the mortar. After that, the adhesive sheet was separated from the surfaces of the aggregates 3, to thus obtain a sample (30 cm×30 cm) of aggregate exposed concrete.

EXAMPLE 2

The aggregates were loaded on an adhesive sheet (30 cm×30 cm) composed of a low viscosity rubber based adhesive in the same manner as Example 1. The aggregate loading sheet was mounted on a hot plate at 100 ° C. for 20 min, and the aggregates were pressed from the top so that part of the aggregates was buried in the adhesive layer. Subsequently, mortar was placed in the same manner as Example 1. This was left for two days after the placing of the mortar. After that, the adhesive sheet was separated, to thus obtain a sample (30 cm×30 cm) of aggregate exposed concrete.

EXAMPLE 3

In the same manner as Example 1, there was prepared a member in which aggregates were loaded and buried on an adhesive sheet (30 cm×30 cm) composed of a rubber based adhesive. The substrate surface of the member thus obtained was stuck on a plate using a double faced adhesive tape. The plate was used as a framework of one wall surface for concrete casting while the aggregate loading surface was directed to the inside, and concrete was cast. The framework was removed after leaving for one week. At this time, the adhesive sheet was separated from the surfaces of the aggregates together with the framework, to thus obtain a sample of excellent aggregate exposed concrete.

As described above, by use of a method of obtaining aggregate exposed finish for concrete according to the present invention, the problems of the prior art have been solved. Namely, according to the present invention, it is possible to provide a method of carrying out aggregate exposed finish for concrete capable of extremely reducing the usage amount of aggregates, and of facilitating the work without requiring the long working time and the technique of a high level.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of making an aggregate exposed finish for concrete using an aggregate loaded adhesive sheet made of a substrate and an adhesive layer coated thereon, and having adhesive properties such that an adhesive strength thereof is sufficient to retain said aggregate before hardening of mortar or concrete, but decreases in contact with hardening mortar or concrete to an extent for facilitating removal of said adhesive sheet from said aggregate, said adhesive layer being of sufficient thickness for burying of said aggregate therein, and comprising the steps of:

loading aggregates on said adhesive sheet;

burying a sufficient part of said aggregates in said sufficiently thick adhesive layer by heating said adhesive layer of said adhesive sheet to thereby fix said aggregates to said adhesive sheet and thus form an aggregate loaded surface on said adhesive sheet;

casting mortar or concrete onto said aggregate loaded surface of said aggregate loaded adhesive sheet;

hardening said mortar or concrete, wherein during said hardening said adhesive strength of said adhesive sheet decreases; and removing said adhesive sheet from said hardened mortar or concrete to expose said aggregate exposed finish for said concrete.

2. A method of making an aggregate exposed finish for concrete using an aggregate loaded adhesive sheet made of a substrate and an adhesive layer coated thereon, and having adhesive properties such that an adhesive strength thereof is sufficient to retain said aggregate before hardening of mortar or concrete, but decreases in contact with hardening mortar or concrete to an extent for facilitating removal of said adhesive sheet from said aggregate, said adhesive layer being of sufficient thickness for burying of said aggregate therein, and comprising the steps of:

loading aggregates on said adhesive sheet;

burying a sufficient part of said aggregates in said sufficiently thick adhesive layer by heating said adhesive layer of said adhesive sheet to thereby fix said aggregates to said adhesive sheet and thus form an aggregate loaded surface on said adhesive sheet;

press-contacting said aggregate loaded surface of said aggregate loaded adhesive sheet with unhardened mortar or concrete;

hardening said mortar or concrete, wherein during said hardening said adhesive strength of said adhesive sheet decreases; and removing said adhesive sheet from said hardened mortar or concrete to expose said aggregate exposed finish for said concrete.

3. A method of making an aggregate exposed finish for concrete using an aggregate loaded adhesive sheet made of a substrate and an adhesive layer coated thereon, and having adhesive properties such that an adhesive strength thereof is sufficient to retain said aggregate before hardening of mortar or concrete, but decreases in contact with hardening mortar or concrete to an extent for facilitating removal of said adhesive sheet from said aggregate, said adhesive layer being of sufficient thickness for burying of said aggregate therein, and comprising the steps of:

loading aggregates on said adhesive sheet;

burying a sufficient part of said aggregates in said sufficiently thick adhesive layer by heating said adhesive layer of said adhesive sheet to thereby fix said aggregates to said adhesive sheet and thus form an aggregate loaded surface on said adhesive sheet;

fixing said substrate of said aggregate loaded adhesive sheet on a form;

casting mortar or concrete in contact with said aggregate loaded surface of said aggregate loaded adhesive sheet;

hardening said mortar or concrete, wherein during said hardening said adhesive strength of said adhesive sheet decreases; and removing said adhesive sheet and said form from said hardened mortar or concrete to expose said aggregate exposed finish for said concrete.

4. A method of making an aggregate exposed finish for concrete using an aggregate loaded adhesive sheet made of a substrate and an adhesive layer coated thereon, and having adhesive properties such that an adhesive strength thereof is sufficient to retain said aggregate before hardening of mortar or concrete, but decreases in contact with hardening mortar or concrete to an extent for facilitating removal of said adhesive sheet from said aggregate, said adhesive layer being of sufficient thickness for burying of said aggregate therein, and comprising the steps of:

loading aggregates on said adhesive sheet;

burying a sufficient part of said aggregates in said sufficiently thick adhesive layer by heating said adhesive layer of said adhesive sheet to thereby fix said aggregates to said adhesive sheet and thus form an aggregate loaded surface on said adhesive sheet;

fixing said substrate of said aggregate loaded adhesive sheet on a form;

press-contacting said aggregate loaded surface of said aggregate loaded adhesive sheet with unhardened mortar or concrete;

hardening said mortar or concrete, wherein during said hardening said adhesive strength of said adhesive sheet decreases; and removing said adhesive sheet and said form from said hardened mortar or concrete to expose said aggregate exposed finish for said concrete.

* * * * *